Aug. 30, 1955 D. M. HAMMOCK 2,716,528
WING-MOUNTED JET NOZZLE FOR AIRCRAFT
PROPULSION AND SUSTENTATION
Filed Dec. 17, 1953 2 Sheets-Sheet 1

INVENTOR
David M Hammock

Aug. 30, 1955 D. M. HAMMOCK 2,716,528
WING-MOUNTED JET NOZZLE FOR AIRCRAFT
PROPULSION AND SUSTENTATION
Filed Dec. 17, 1953 2 Sheets-Sheet 2

INVENTOR

David M Hammock

United States Patent Office 2,716,528
Patented Aug. 30, 1955

2,716,528

WING-MOUNTED JET NOZZLE FOR AIRCRAFT PROPULSION AND SUSTENTATION

David M. Hammock, Falls Church, Va.

Application December 17, 1953, Serial No. 398,831

1 Claim. (Cl. 244—12)

Summary

Figure 1:
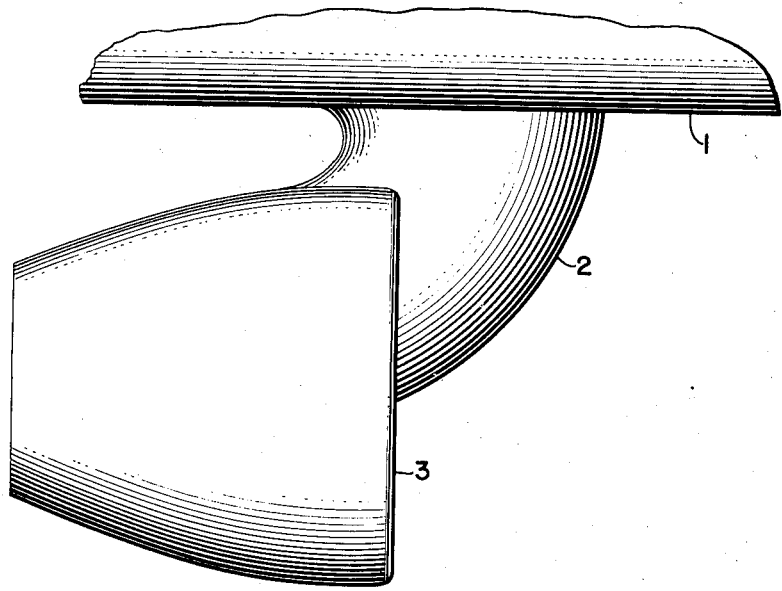
Figure 2:
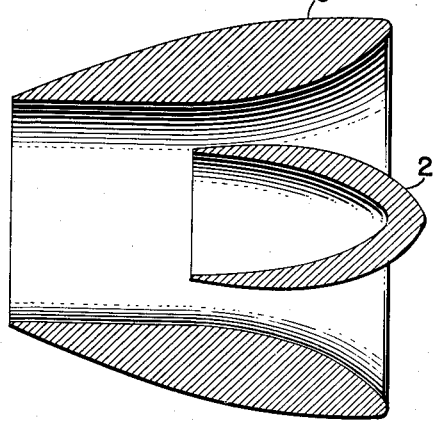
Figure 3:
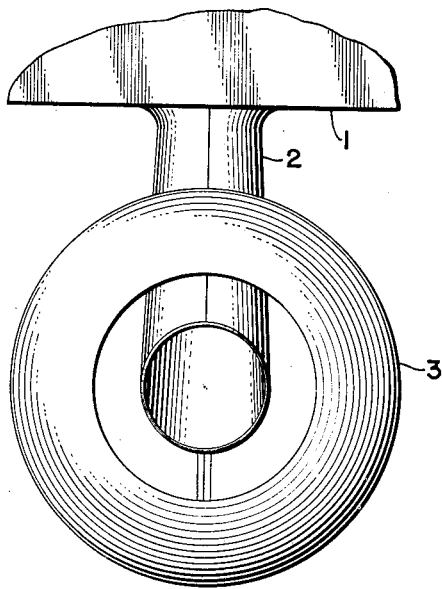
Figure 4:
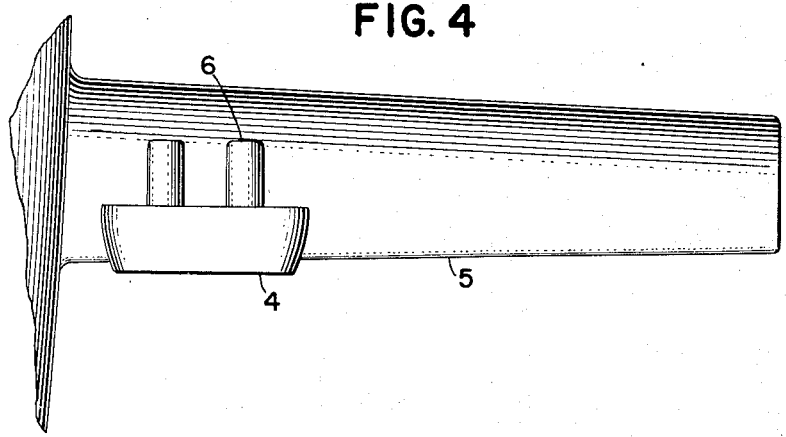
Figure 5:
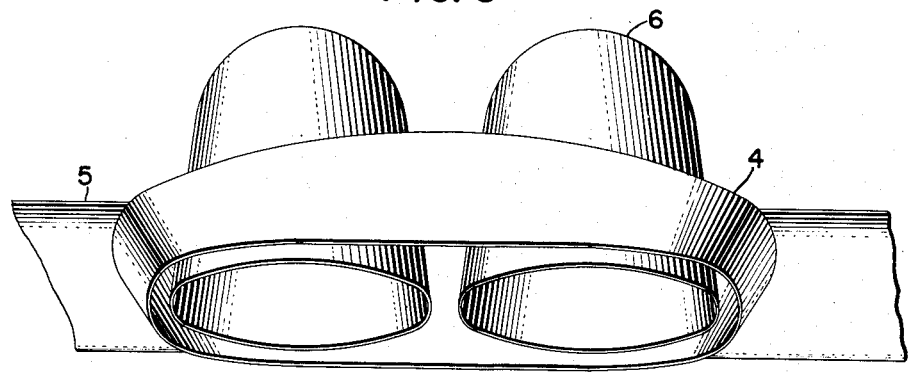

The invention is a compound nozzle consisting of one nozzle outside of one or more nozzles. The nozzles are formed of hydrofoil or airfoil section with the inner nozzle placed effectively in the throat of the outer nozzle. The nozzles may have a circular form as shown in Figs. 1, 2 and 3, or may have an elongated or eliptical form as shown in Figs. 4 and 5. Parts of the outer nozzle to meet certain design conditions might be built into the hull of a vessel or fuselage of an aircraft. The primary purpose of the compound nozzle arranged as shown in Figs. 1 to 3 is to increase the propulsive efficiency, while the primary purpose of the arrangement of nozzles and engines as shown in Figs. 4 and 5 is to increase the lift of the wing.

Drawing description

The drawings consist of Figs. 1, 2 and 3 on one sheet and Figs. 4 and 5 on another sheet. Fig. 1 is a side view in which 1 is a portion of the main body of the craft being propelled, 2 is the high pressure supply pipe for the inner nozzle combined with fairing, forming the support for the outer induced flow nozzle which is 3. Fig. 2 is a section cut by a horizontal plane passed through the center of the nozzle's outlet when viewed from above. Fig. 3 is a view looking into the outlet of the compound nozzle.

Fig. 4 is the top view of the wing of an aircraft showing the arrangement of the engines and compound nozzle when they are used to gain maximum lift. The induced flow nozzle is designated by 4, the wing by 5 and the intakes for the engines by 6. Fig. 5 is a view looking into the outlet of the compound nozzle and showing a portion of the wing in which it is mounted.

Description, best application and mode of construction

The application of jets to steer and propel boats has a long history. The efficiency of jets compared to paddle wheels or propellers made them of little practical value as a means for propelling boats. This compound nozzle, however, increases the thrust (or efficiency) of a jet such that it should have application to the propulsion of harbor fire boats where large pump capacity is already installed and could be shunted to the compound nozzles enroute to a fire. Application to shallow water boats or boats whose use causes frequent grounding would involve much less maintenance than that necessary for a propeller. The compound nozzle if made rotatable could be used to undercut mud or sand banks the boat might possibly ground on.

I consider the best mode of construction of the compound nozzle for boats in sizes up to 20 inches diameter to be metal casting. Larger nozzles than this would probably be more economically fabricated as internally framed welded sections.

The compound nozzle when applied to an airplane would have such drag due to nozzle structure that it would cancel the increase in propulsive efficiency at speeds above 300 M. P. H. The compound nozzle's practical application would be for the propulsion of cargo aircraft where the extensive low pressure area ahead of the compound nozzle could be utilized to greatly increase the lift of the wing. This lift increment and the efficiency improvement over a conventional jet would be most pronounced during take-off. This would allow relatively large planes to use short runways. It has many advantages for military type cargo aircraft. Placing the engine intakes over the wing rather than ahead of it will also increase the lift at some increase in required engine compressor power.

The best mode of construction for the aircraft nozzle would be to construct it as an integral unit of the wing with its own appropriate framing similar to frame systems as used in stabilizers and control surfaces.

Principle of operation

The fundamental reason why the compound nozzle will produce more thrust than the simple nozzle is that thrust is equal to the mass multiplied by the change in velocity of that mass, yet the energy required to change the velocity is equal to one-half the mass times the difference of final velocity squared minus the initial velocity squared. The energy required to produce the thrust is then proportional to the square of the velocity while the thrust is proportional to velocity. It is therefore possible to produce (with a given amount of energy) more thrust with a large mass and low velocity than with a small mass and high velocity. The higher efficiency of large propellers over small propellers producing the same thrust is a demonstration of this.

This invention when applied to an airplane will increase the propulsive efficiency. The drag caused by the additional structure will cancel the efficiency increase at some flight speed. The compound nozzle applied to a cargo aircraft should at least have the propulsive efficiency of a simple jet and perform the added function of increasing the lift of the wing.

The particular advantage of the compound nozzle to cargo aircraft occurs during take-off. During this period the simple jet has comparatively low thrust and efficiency. The acceleration produced by a simple jet is consequently low and the lift supplied by the wing is due to its forward motion alone.

Take-off conditions present the compound nozzle at its best. In the take-off interval the drag caused by the induced flow nozzle 4 is negligible, the increase in thrust or efficiency over a simple nozzle is its maximum and the reduced pressure area ahead of the compound nozzle contributes greatly to the lift of the wing. All the foregoing conditions contribute to short take-off runs with heavy loads.

I claim:

In combination with a sustaining airfoil, a jet device mounted thereon and arranged to discharge fluid rearwardly of said airfoil, said device comprising an inner nozzle and an outer annular nozzle, said annular nozzle having an intake end and a discharge end and being coaxial of and encompassing said inner nozzle, whereby a discharge of energized fluid from said inner nozzle will induce a flow of air through said annular nozzle, said intake end being located adjacent the rear portion of the upper surface of said airfoil, whereby to produce a rearward flow of air over the upper surface of said airfoil into said intake end when energized fluid is discharged from said inner nozzle.

References Cited in the file of this patent

UNITED STATES PATENTS

| | | |
|---|---|---|
| 1,375,601 | Morize | Apr. 19, 1921 |
| 2,453,721 | Mercier | Nov. 16, 1948 |
| 2,611,555 | Custer | Sept. 23, 1952 |

FOREIGN PATENTS

| | | |
|---|---|---|
| 940,889 | France | June 14, 1948 |